(12) United States Patent
Currie

(10) Patent No.: US 7,044,077 B1
(45) Date of Patent: May 16, 2006

(54) MECHANICAL WARNING DEVICE

(75) Inventor: Bradley C. Currie, Stacy, MN (US)

(73) Assignee: Royal Environmental Systems, Inc., Stacy, MN (US)

( * ) Notice: Subject to any disclaimer, the term of this patent is extended or adjusted under 35 U.S.C. 154(b) by 0 days.

(21) Appl. No.: 11/056,780

(22) Filed: Feb. 11, 2005

(51) Int. Cl.
*G01F 23/42* (2006.01)

(52) U.S. Cl. .................. 116/109; 116/110; 116/227

(58) Field of Classification Search ............... 116/109, 116/110, 111, 227, 228, 229; 73/307, 308, 73/317, 318, 322.5
See application file for complete search history.

(56) References Cited

U.S. PATENT DOCUMENTS

| | | | | |
|---|---|---|---|---|
| 740,516 A | * | 10/1903 | Bassette | .................. 116/111 |
| 1,676,565 A | * | 7/1928 | Vallee et al. | .................. 73/307 |
| 2,463,304 A | * | 3/1949 | Pick | .................. 116/303 |
| 2,468,284 A | * | 4/1949 | Balken | .................. 73/317 |
| 2,594,885 A | * | 4/1952 | Due | .................. 116/229 |
| 2,939,419 A | * | 6/1960 | Hawkins | .................. 116/228 |
| 3,182,505 A | * | 5/1965 | Harks | .................. 73/307 |
| 3,428,078 A | * | 2/1969 | Christopher | .................. 137/416 |
| 3,960,107 A | * | 6/1976 | McCloskey | .................. 116/228 |
| 5,862,775 A | * | 1/1999 | Stroud | .................. 116/228 |
| 5,934,306 A | * | 8/1999 | Guillemenet et al. | .................. 137/43 |

\* cited by examiner

*Primary Examiner*—R. Alexander Smith
(74) *Attorney, Agent, or Firm*—Nikolai & Mersereau, P.A.

(57) ABSTRACT

The mechanical signaling device is used for indicating when contaminates are present in water in a manhole so that the contaminated can be cleaned out of the manhole before the contaminates are released into the environment. The mechanical signaling device has a flag which moves up to a visible warning position when triggered by contaminates entering a float in the manhole which will then weigh the float down which pulls on a cable attached to a trigger which releases a spring loaded flag to pop up into view. The flag is easily reset by pushing it back down against the force of the spring until it is reset for release by the triggering mechanism. The mechanical signaling mechanism is housed in a pipe and has a protective cover preventing snow from resting on the top cover, further a top cover seals pipe when the flag is down.

8 Claims, 4 Drawing Sheets

MECHANICAL WARNING DEVICE

BACKGROUND OF THE INVENTION

1. Field of the Invention

This invention relates to mechanical signaling devices for visually indicating a condition that needs to be attended to such as cleaning or maintenance.

2. Description of the Related Art

Currently when contaminates such as oils or other light liquid pollutants in run off water from parking lots, streets or other areas, are present in a manhole of a sewer system there is no way to tell that the contaminants need to be removed before they escape downstream in the sewer system and pollute the environment without physically opening the manhole cover and observing the condition of the contents of the manhole. It would be beneficial to have a flag or other mechanically visible means for determining if the sewer or manhole needs to be cleaned out to remove contaminants before they escape into the environment.

SUMMARY OF THE INVENTION

The mechanical warning device has a mechanical trip mechanism with a highly visible pop up indicator, which is visible when tripped. Cabled to the trip mechanism is an actuator having an approximate minimum actuating force of one pound.

Generally the mechanism warning device is connected to a stop spill control device, which prevents drainage of the contaminated fluid into and out of the contaminated vessel. The spill control device has a float connected to a mechanical shutoff valve. When light liquid contaminates such as oil are floating on top of the water in the containment vessel the float is calibrated to fill and sink at a specific amount of contaminates floating on the water. When the liquid level surpasses the calibrated level the float sinks mechanically shutting off the inflow of more contaminates into the vessel and actuating the mechanical warning device at the same time. When the float sinks it pulls on the cable connected to a spring release mechanism allowing a warning flag to pop upward for visually indicating that the contaminate vessel has a contaminate therein which needs to be removed. After the contaminate is removed from the contaminate vessel, the operator resets the spring mechanism for raising the warning flag which will signal the next time the vessel needs to be cleaned out due to contaminates therein.

OBJECTS OF THE INVENTION

It is an object of the invention to mechanically provide a visible indication of a condition, which needs attention.

It is an object of the invention to provide a visual indication of a contaminant in a manhole, which needs to be cleaned before the contaminant escapes into the environment.

It is an object of the invention to provide a low cost, reliable indication that there are contaminants in a manhole.

It is an object of the invention to protect the environment by signaling when contaminants are present in a manhole.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
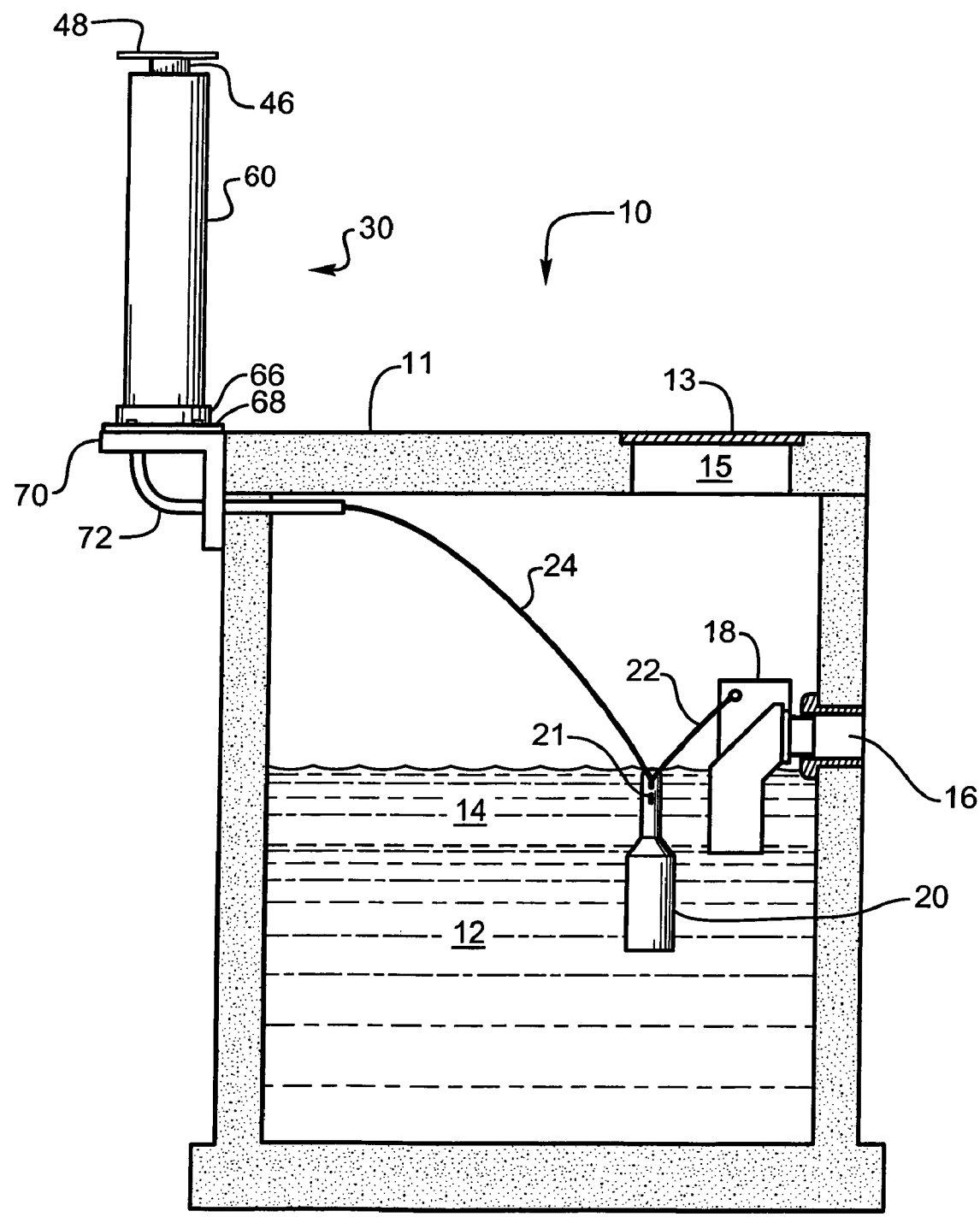
FIG. 1 is a side view of a side mounted mechanical signal device with the signal flag up.
Figure 4:
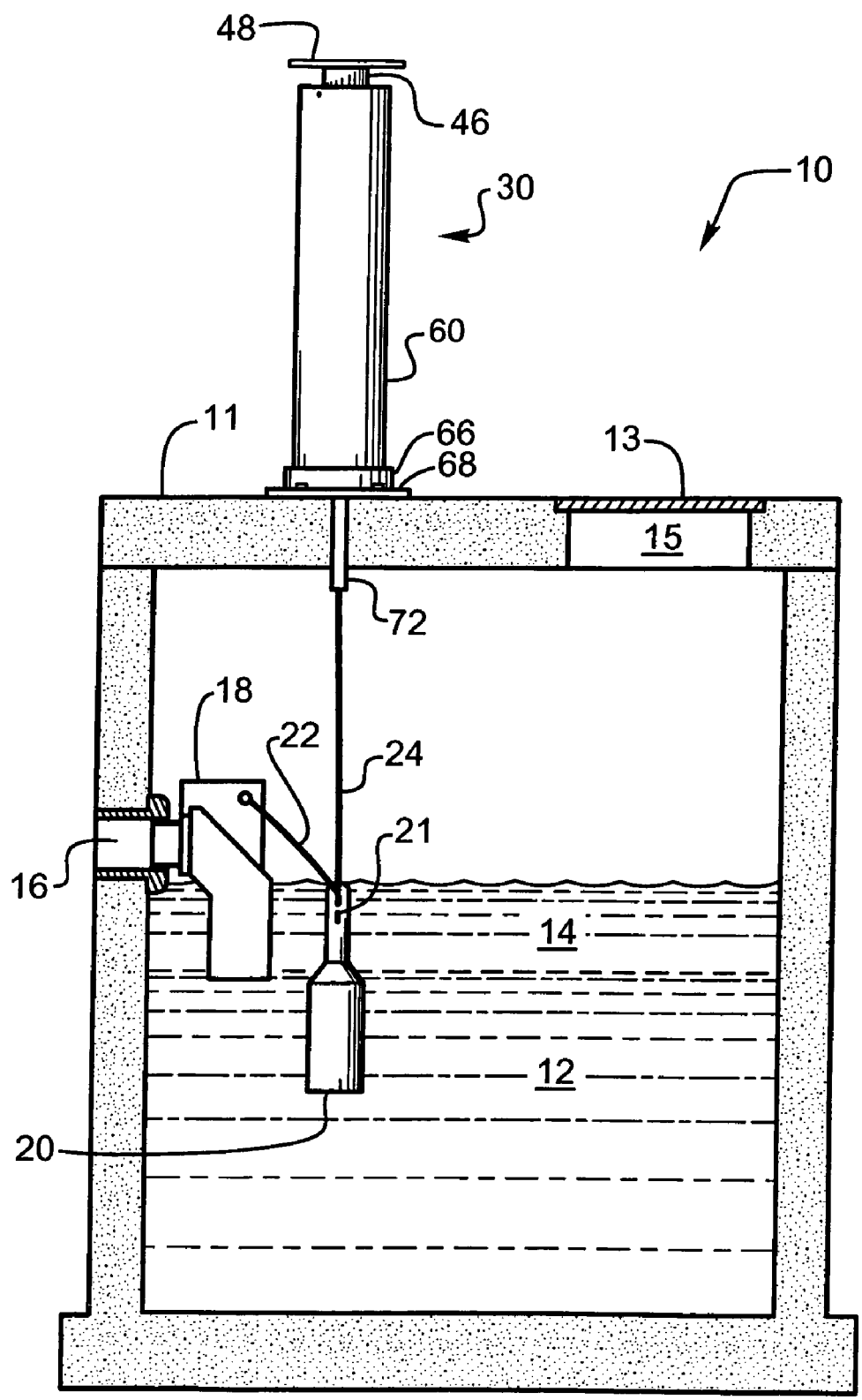
FIG. 4 is a side view of a top mounted mechanical signal device with the signal flag up.

The mechanical warning device 30 is shown installed on the side of a manhole 10 in FIG. 1. The manhole 10 contains water 12 and contaminates 14. The fluid level in the manhole can rise to the level of inlet aperture 16. When contaminates 14 rise to a predetermined level float 20 will drop due to contaminants 14 entering float 20 through apertures 21. When float 20 drops it pulls on lever 22 which activates control valve 18 to prevent additional contaminates from entering the manhole 10 through aperture 16. Float 20 also is connected to cable 24, which connects to mechanical warning device 30 triggering the mechanism therein to send signal flag 46 up to the warning position. As shown in FIG. 1 cable 24 enters cable tube 72 which passes though the side of manhole 10 near the top which connects to the mechanical warning device 30 supported on mounting bracket 70 attached to the top of the outside diameter of the manhole 10. In other embodiments the mechanical warning device 30 may be attached to the top of the manhole 10 as shown in FIG. 4.

Figure 2:
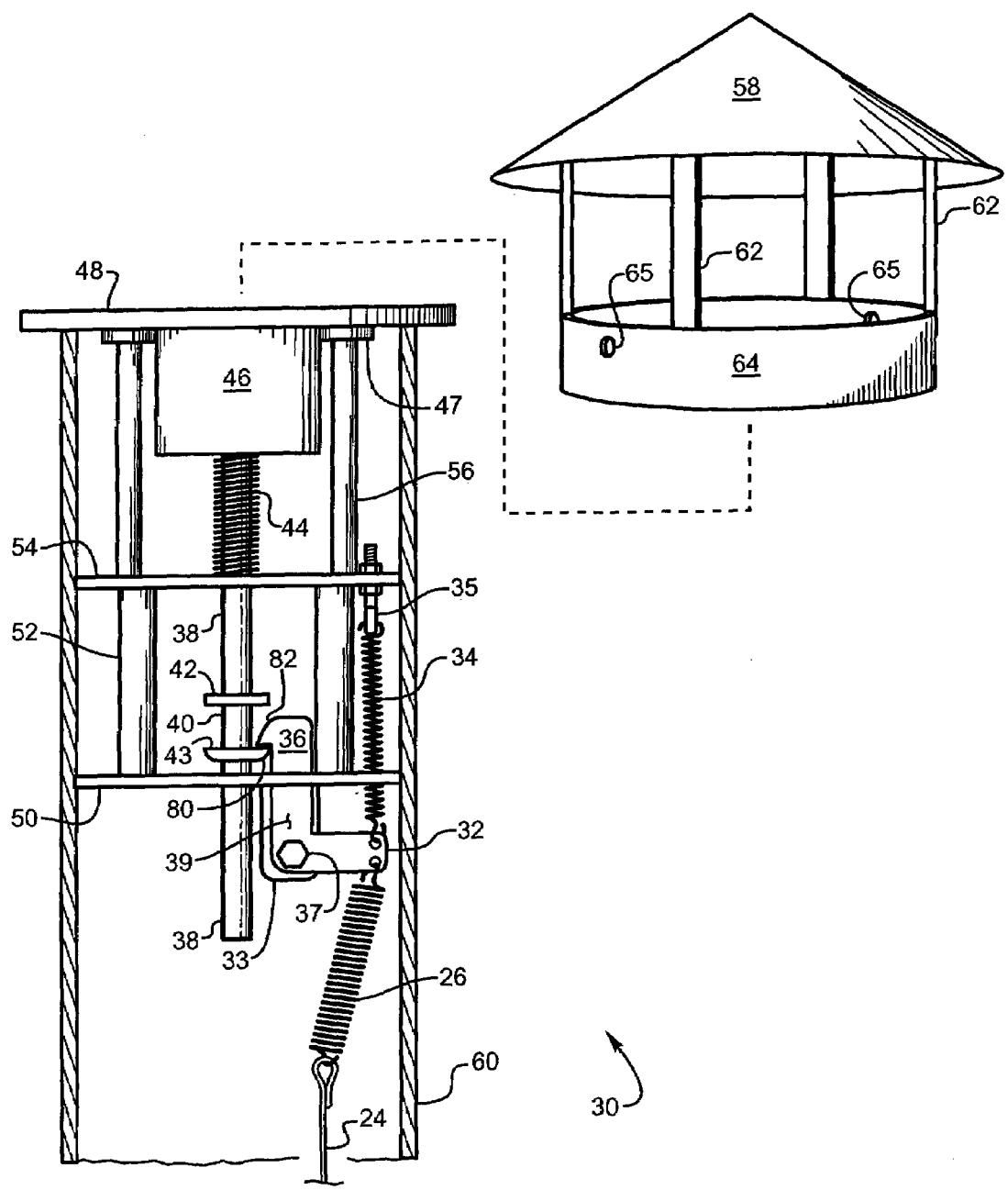
FIG. 2 is a side view the mechanical signal device with the signal flag down.
Figure 3:
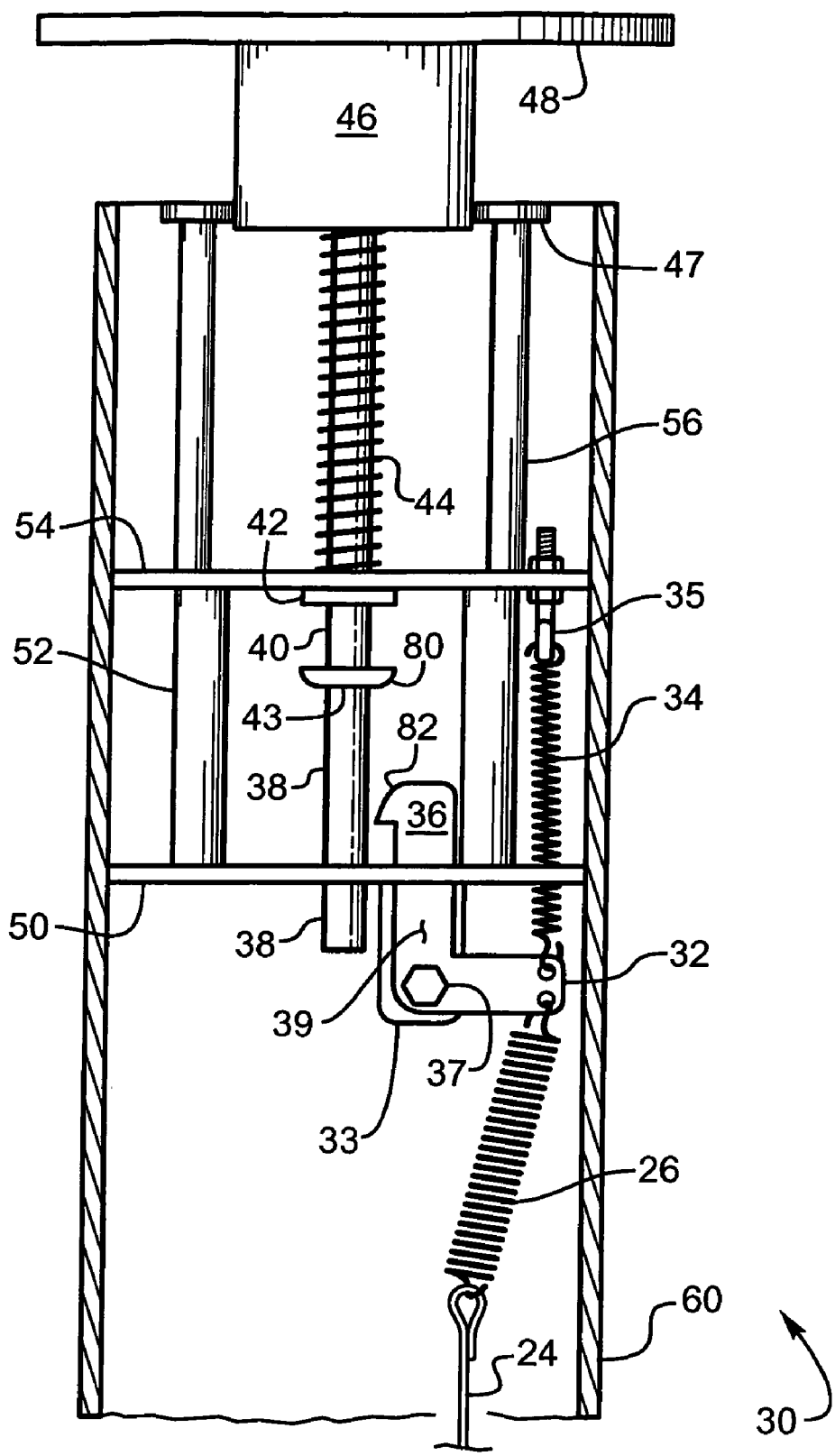
FIG. 3 is a side view the mechanical signal device with the signal flag up.

As best seen in FIGS. 2 and 3 the detailed structure of the mechanical warning device 30 shows cable 24 connected to trip spring 26, which is connected to reset lever arm 32 on trigger 39. The trigger 39 is pivotally connected to bracket 33 by bolt 37 such that when reset lever arm 32 is pulled downward reset engagement head 36 is withdrawn from indentation 40, between flanges 42 and 43 on rod 38 allowing rod 38 to be pushed upward by spring 44 which is compressed into a ready to activate state between top plate 54 and the base of signal flag 46. The flag will then extend out of pipe 60 such that it is visible indicating that there is a contaminate 14 in the manhole 10, which needs to be cleaned out before it can escape into the environment.

The signal flag 46 which is attached to rod 38 is stopped from traveling upward when flange 42 engages the bottom of top plate 54. As shown the mechanical warning device has a base plate 50 with an aperture in the center for rod 38 to pass therethrough. Base plate 50 has base columns 52 for supporting top plate 54. Top plate 54 supports eyebolt 35, which has a reset spring 34 attached. Reset spring 34 is attached to reset lever 32 to ensure that the reset engagement head 36 resets against rod 38 unless overpowered by spring 26 to trip the system.

When the signal flag 46 is up it can be manually reset by pressing down on cover plate 48 which is on the top of signal flag 46. Pressing downward on cover plate 48 compresses spring 44 and pushes the curved underportion 80 of flange 43 against the curved interface portion 82 on reset engagement head 36. When reset engagement head 36 is in the indentation 40 between flange 42 and flange 43 the mechanical warning device is reset and will stay in place due to spring 34 keeping reset engagement head 36 in place.

Columns 56 are attached to top plate 54 and have rest tabs 47 at the top. Rest tabs 47 engage cover plate 48 stopping further downward movement of rod 38 and corresponds to the position of the indentation portion 40 of rod 38 with the reset head 36.

In the embodiment shown in FIG. 2, 3 the mechanical signaling device 30 is housed in a pipe 60. The cover plate 48 extends out over the pipe 60 to block entry to the pipe 60 when the signal is in the down position.

As best shown in FIG. 2 a cap 58 may be optionally placed over the pipe 60 to keep snow and ice from accumulating on the cover plate 48 and interfering with the mechanical signaling device mechanism 30. Cap 58 is supported by strips 62 attached to rim 64 which can be attached to pipe 60 by bolts entering the pipe and through apertures 65 in the rim 64.

The pipe 60 containing signaling device mechanism 30 is inserted into collar 66 on collar base 68 to secure the signaling device mechanism 30 to the top of the manhole 10 as shown in FIG. 4 or to the bracket 70 attached to the side of manhole 10 as shown n FIG. 1.

The cover plate 48 preferably is large enough to cover the opening of pipe 60 to prevent exposing the signaling mechanism parts to the elements when it is in the nonsignaling position.

The mechanical signaling device 10 provides a low cost easy to reset mechanical signal by raising signal flag 46 when there is a contaminate in the manhole which needs to be taken out of manhole 10. When a contaminate is present manhole cover 13 can be removed from aperture 15 in the top of the manhole and the contaminate removed.

Obviously, many modifications and variations of the present invention are possible in light of the above teachings. It is therefore to be understood that, within the scope of the appended claims, the invention may be practiced otherwise than as specifically described.

What is claimed is:

1. A mechanical signaling device comprising,
   a base plate having at least one aperture therethrough
   a column having a first end and a second end, the first end attached to the top of the base plate
   a top plate having at least one aperture therethrough, the top plate attached to the second end of the column,
   a rod passing trough the aperture in the top plate and the aperture in the base plate,
   a signal flag attached to the rod at a position above the top plate near the top end of the rod,
   a cover plate attached at the top end of the rod,
   a second column attached to the top of the top plate, the second column having a rest tab on the top for engaging and limiting the downward position of the cover plate,
   a spring surrounding the rod and extending from the top of top plate to the base of the signal flag, such spring being compressed when the signal flag is in its down position and relaxed when the signal flag is in its up position,
   a latch and release mechanism for engaging and locking the rod in position when the signal flag is in its down position and for releasing the rod so that the spring can push the signal flag to its up position,
   a cable attached at one end to the latch and release mechanism and attached at the other end to a float supported by a fluid, such that the float drops when a contaminate is present and enters the float through slits in the top portion of the float said float thereby becoming heavier and sinking, triggering the latch and release mechanism to place the signal flag in an up position when a contaminate is present.

2. A mechanical signaling device as in claim 1 wherein,
   a flange on the rod under the top plate acts as a limit to the upward movement of the rod by engaging the bottom of the top plate.

3. A mechanical signaling device as in claim 1 wherein,
   the latch and release mechanism has a bracket attached to the base plate which pivotably holds a trigger having a reset engagement head which releaseably engages a flange on the rod for securing the flag in a down position when engaged, the trigger having a reset lever with a reset spring and a tripping spring, the reset spring attached to the top plate for urging the reset engagement head against the rod and the tripping spring connected to the cable attached to the float for releasing the reset engagement head from the flange such that the signal flag moved to the up position.

4. A mechanical signaling device as in claim 1 wherein,
   a housing for surrounding the mechanical signaling device from the trigger to the top of the second columns.

5. A mechanical signaling device as in claim 4 wherein,
   a cap having supports and a rim at the base of the supports, the rim attached at the top of the housing such that the cap covers the top of the housing, wherein the flag is visible between the top of the housing and the cap.

6. A mechanical signaling device as in claim 4 wherein, the cover plate covers the top of the housing.

7. A mechanical signaling device as in claim 1 wherein, the housing is mounted on a bracket on the side of a manhole.

8. A mechanical signaling device as in claim 1 wherein, the housing is mounted on a bracket on the top of a manhole.

* * * * *